M. BECK.
FRICTION CLUTCH.
APPLICATION FILED MAR. 24, 1913.

1,100,048.

Patented June 16, 1914.
2 SHEETS—SHEET 2.

Witnesses
Inventor
Marshall Beck

UNITED STATES PATENT OFFICE.

MARSHALL BECK, OF MOLINE, ILLINOIS, ASSIGNOR TO THE BORG & BECK COMPANY, OF MOLINE, ILLINOIS, A CORPORATION OF ILLINOIS.

FRICTION-CLUTCH.

1,100,048.  Specification of Letters Patent.  Patented June 16, 1914.

Application filed March 24, 1913. Serial No. 756,371.

*To all whom it may concern:*

Be it known that I, MARSHALL BECK, a citizen of the United States, residing in Moline, in the county of Rock Island and State of Illinois, have invented certain new and useful Improvements in Friction-Clutches, of which the following is a specification.

This invention relates to friction clutches and has for its object broadly to provide an adjustment or take-up device in a friction clutch, which will permit the wearing surfaces of the clutch to be adjusted relatively to each other desired amounts without affecting the efficiency of the clutch or the action of its relatively moving parts.

The invention has relation to the subject matter of my companion application, Serial No. 756,370, filed March 24, 1913, and presents another form of adjustment or take-up device of novel construction for use in friction clutches.

A further object of the invention is to provide an adjustment or take-up device in a friction clutch which may readily be operated without requiring that any of the parts of the clutch be removed.

Additional objects and advantages of the invention will be apparent as it is better understood from the following description taken in connection with the accompanying drawings illustrating a preferred embodiment thereof.

Figure 1:
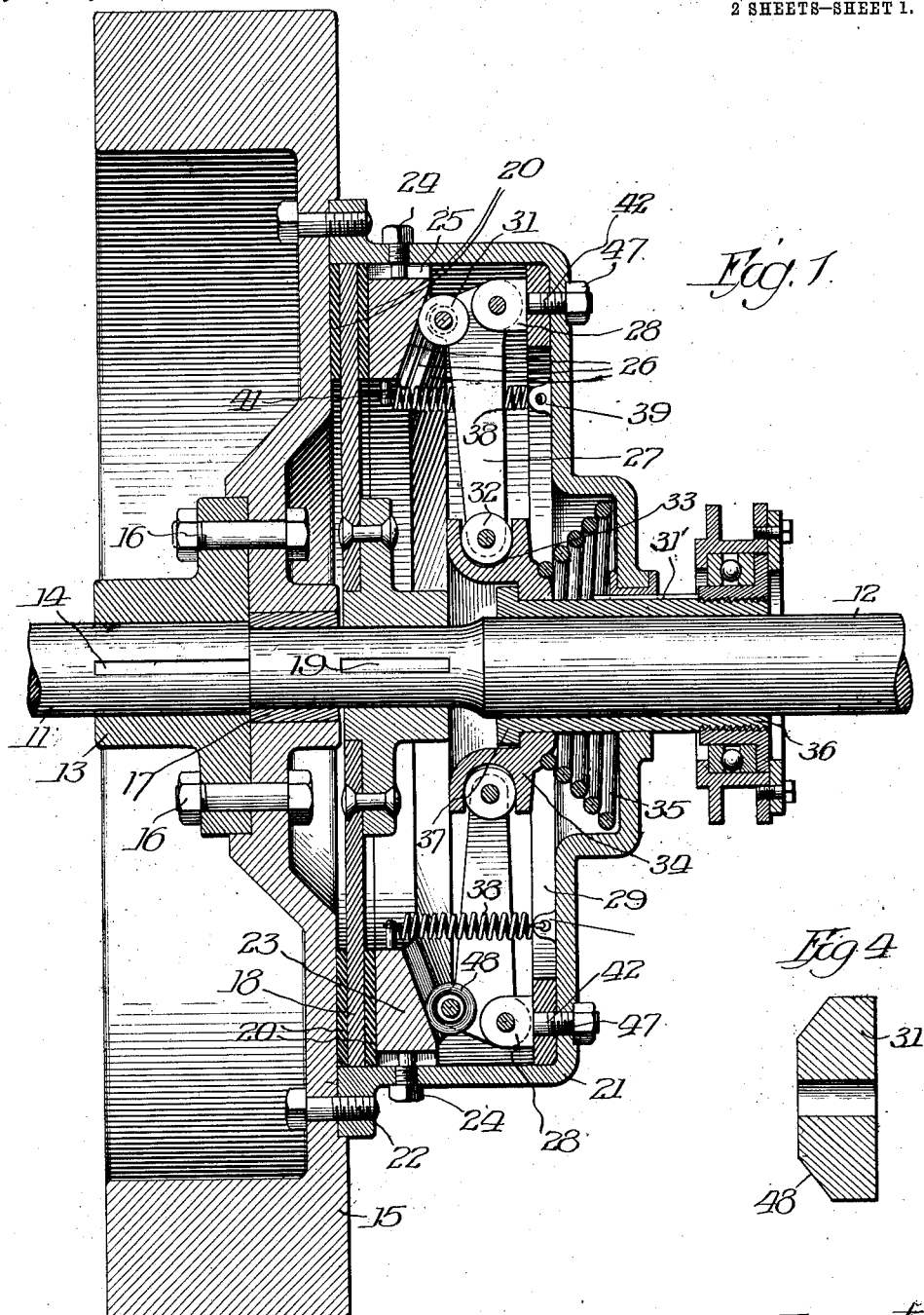
Figure 2:
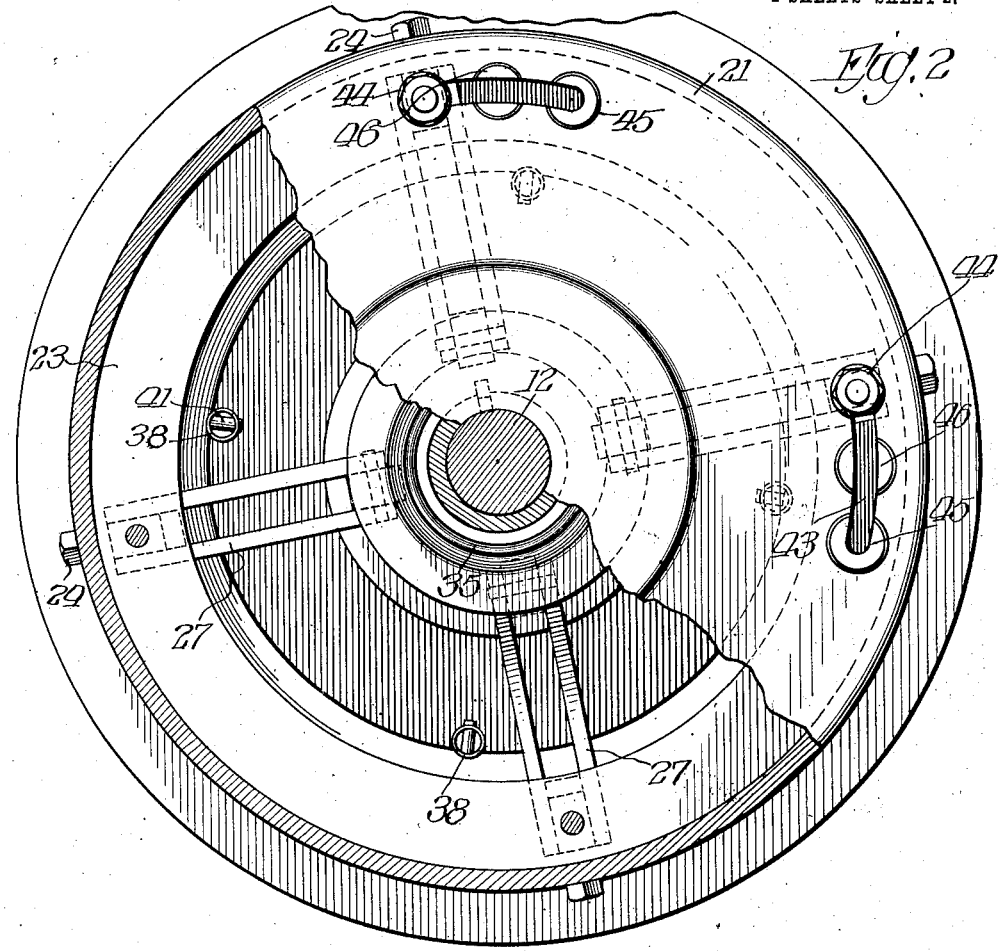
Figure 3:
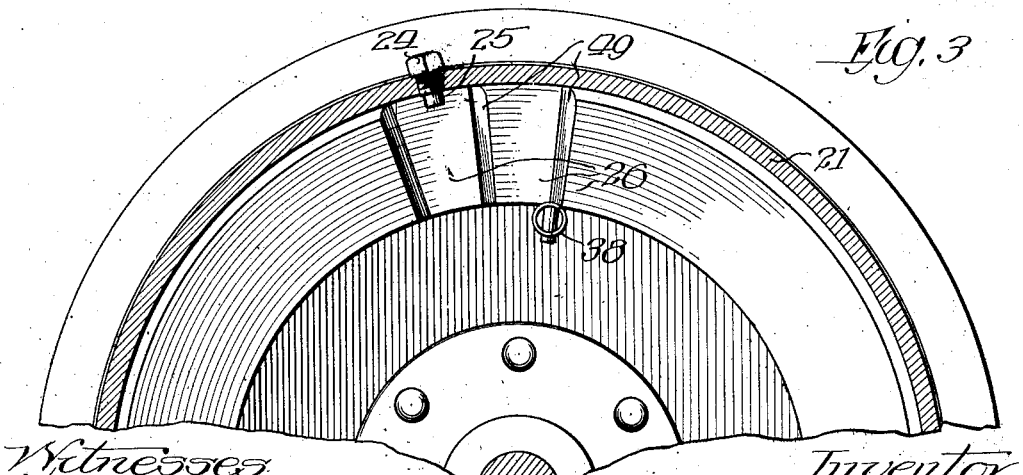

On the drawings:—Figure 1 is a longitudinal sectional view of a clutch embodying my invention; Fig. 2 is an end elevation of the same with parts broken away; Fig. 3 is a partial transverse sectional view through the clutch; and Fig. 4 is an enlarged detail sectional view of one of the rollers.

Referring to the drawings, 11 designates the driving shaft and 12 the driven shaft. Upon a collar 13 keyed to the driving shaft 11 at 14 is fastened a fly-wheel 15 by bolts or other suitable fastening means 16 so that the fly-wheel, collar and shaft rotate as a single unit and together may be termed the driving element. The shaft 12 is journaled at its end adjacent the shaft 11 in a pilot bearing 17 provided at the center of the fly-wheel 15. Upon the shaft 12 a friction disk 18 is mounted to move longitudinally of the shaft, and this disk is caused to rotate with the shaft 12 by a spline 19. A clutch casing 21 is fastened to the fly-wheel by means of bolts 22 and incloses the disk 18. Within the casing 21 a thrust ring 23 is mounted to move longitudinally thereof and is held against rotation relatively to the casing and fly-wheel by means of driving pins 24 threaded into the casing and taking into transverse slots 25 in the periphery of the thrust ring. A friction ring 20 of asbestos or other suitable material is interposed between the adjacent faces of the fly-wheel and disk and a similar friction ring is interposed between the adjacent faces of the disk and thrust ring. The face of the thrust ring distant from the disk 18 is formed to provide a plurality of sets of beveled or inclined thrust seats 26 which receive the thrust from the bell cranks to be presently described. In the present instance each set consists of three seats located at different distances from the friction disk 18 and arranged in stepped relation. The two seats nearest the disk 18 are preferably formed by cutting away the face of the thrust ring adjacent the rear wall of the casing and the seat farthest from the disk 18 is a continuation of the main portion of this face of the thrust ring.

The thrust ring is moved against the friction disk to throw in the clutch by a set of bell cranks 27 which are pivotally mounted in lugs 28 upon a ring 29 provided at the rear of the casing. The ends of the arms of each of these bell cranks are preferably but not necessarily provided with the rollers 31 and 32, the roller 31 on the short arm of the bell crank being adapted to travel outwardly over a beveled seat 26 of the thrust ring when the bell crank is moved from its normal position about its pivotal connection with the ring 29 to force the thrust member toward the fly-wheel. The roller 32 is mounted in a suitable groove 33 of a collar 34 which is pressed toward the left, viewing Fig. 1, away from the rear wall of the casing by a spiral expansion spring 35. The collar 34 is mounted upon a clutch throw-out sleeve 36 at the end of which within the casing is provided an outwardly extending flange 37 which is adapted to engage the collar 34 when the sleeve is moved against the force of the spring 35 toward the right, viewing Fig. 1, by any suitable mechanism to throw out the clutch. This sleeve is caused to rotate with the casing and with the driving element by a spline 31′ slidably connecting it to the rear wall of the casing.

A plurality of springs 38 fastened at one end at 41 to the thrust ring and at the other end at 39 to the rear wall of the casing causes the thrust ring to follow the rollers 31 when the bell cranks are moved to throw out the clutch, causing the frictional engagement between the thrust ring and the friction disk to be broken immediately and also causing the thrust ring to press firmly against the rollers 31 and through them against the bell cranks, preventing rattling and shaking of the parts when the clutch is thrown out.

The ring 29 to which the bell cranks are pivoted is adapted to be adjusted angularly with respect to the rear wall of the casing to seat the rollers in desired thrust seats in the thrust ring, and to this end the ring 29 is secured to the rear wall of the casing by a plurality of bolts 42, fixed at one end in the ring 29 and protruding through arcuate slots 43 in the rear wall of the casing. Each of the bolts 42 is preferably fastened to the ring 29 behind a lug 28 to which is pivoted one of the bell cranks, and each of the slots 43 is located in the casing opposite a set of thrust seats 26. At each end of each slot 43, a recess 44, 45 is provided in the outer face of the rear wall of the casing and a similar recess 46 is provided intermediate the ends of the slot. A nut 47 upon the end of the bolt 42 disposed through the slot is adapted to rest in one of the recesses 44, 45, 46 and prevent angular movement of the ring with respect to the rear wall of the casing. The three recesses of each groove constitute a set corresponding to a set of beveled seats on the thrust ring and the individual members of the set of recesses are in the present instance located opposite the corresponding individual members of the set of beveled seats.

When the asbestos or friction rings 20 are new, the rollers 31 will be engaged in the deepest seats 26 and the nuts 47 will be positioned in the recesses 44 in the rear wall of the casing opposite these seats. When the asbestos rings have worn sufficiently to prevent the bell cranks from pressing the thrust ring into sufficiently firm engagement with the friction disk, the nuts 47 may be unscrewed until they clear the outer surface of the rear wall of the casing and the ring 29 shifted angularly by moving the bolts along the slots 43 to dispose the nuts 47 opposite the recesses 46, bringing the rollers into position to engage the next adjacent seats in the thrust ring which, as will be seen, are farther from the friction disk than are the seats engaged by the rollers 31 when the nuts are locked in the recesses 44. The tightening of the nuts will position them in the recesses 46 and maintain the clutch in this adjusted position. When the asbestos or friction rings have worn so that this position of the rollers 31 does not permit the thrust ring to be efficiently actuated by the bell cranks, the ring 29 is further shifted in the manner described until the nuts 47 may be seated in the recesses 45 whereupon the rollers 31 act upon the seats farthest from the friction disk. In order that each roller may slide easily from one set of seats to the next, I prefer to cut away its forward peripheral edge to provide a beveled face 48, as shown in Fig. 4, and I have connected the seats of a set by inclined surfaces 49, as shown in Fig. 3, the beveled face 48 sliding up the surfaces 49 connecting the seats to and from which the roller is moved in effecting the adjustment. It will be apparent that as the bell cranks thrust directly against the thrust ring and have no fixed connection therewith or with the throw-out sleeve, they will act with equal efficiency in all of the adjusted positions, and that as the nuts, which are the only parts which must be manipulated in adjusting the clutch, are located without the casing no parts of the clutch need be removed to perform this operation.

It is thought that the invention and many of its attendant advantages will be understood from the foregoing without further description and it will be obvious that numerous changes may be made in the construction and arrangement of the parts without departing from the spirit and scope of the invention or sacrificing any of its advantages, the form herein before disclosed being merely one preferred embodiment thereof.

I claim:

1. In a friction clutch, the combination of a driving element, a driven element, a casing fixed to one element and embracing the other element, a thrust member mounted within and rotatable with the said casing and having a plurality of thrust seats of varying depth, a bell crank pivoted within the casing and adapted to engage said seats, and means adjustable angularly of the casing for maintaining the said bell crank in position to engage a desired seat.

2. In a friction clutch, the combination of a driving element, a driven element, a casing fixed to one element and embracing the other element, a member mounted within and rotatable with said casing and having a plurality of beveled thrust seats upon its face adjacent the rear wall of the casing, a bell crank pivoted within the casing and adapted to engage said seats and move the member longitudinally of the casing to establish frictional engagement between the elements, and means disposed through the casing and angularly adjustable with respect to the said member for maintaining the bell crank in position to engage a desired seat.

3. In a friction clutch, the combination of a driving element, a driven element, a casing fixed to one element and embracing the other element, a thrust member mounted within and rotatable with said casing and having a plurality of thrust seats of varying depth in its face adjacent the rear wall of the casing, a bell crank pivoted within the casing and adapted to engage said thrust seats, and means disposed through the said rear wall of the casing and shiftable about its center for maintaining said bell crank in position to engage a desired seat.

4. In a friction clutch, the combination of a driving element, a driven element, a casing fixed to one element and embracing the other element and having an arcuate slot in its rear wall, a member disposed within and rotatable with said casing and having a plurality of thrust seats of varying depth in its face adjacent said rear wall, a bell crank adapted to engage said seats to move the member and establish frictional engagement between the elements, and means connected to the said bell crank and disposed through the slot in the rear wall of the casing for moving the bell crank about the axes of rotation of the casing and member to permit the bell crank to engage a desired seat.

5. In a friction clutch, the combination of a driving element, a driven element, a casing fixed to one element and embracing the other element and having an arcuate slot in its rear wall, a member mounted within and rotatable with said casing and having a plurality of thrust seats of varying depth in its face adjacent the rear wall of the casing, a bell crank adapted to engage said thrust seats, and a pivotal mounting for said bell crank disposed through the said slot in the rear wall of the casing adapted to be moved lengthwise of the slot to angularly adjust the said bell crank relatively to the said member and permit the bell crank to engage a desired thrust seat.

6. In a friction clutch, the combination of a driving element, a driven element, a casing fixed to one element and embracing the other element and having an arcuate slot in its rear wall, a member mounted within and rotatable with the casing and having a plurality of thrust seats of varying depth in its face adjacent said rear wall of the casing, a bell crank mounted within the casing and adapted to engage said thrust seats, a mounting for said bell crank disposed through the said slot and movable lengthwise thereof for adjusting the said bell crank angularly with respect to the said member to permit said bell crank to engage a desired thrust seat, and means for locking the said bell crank in adjusted position.

7. In a friction clutch, the combination of a driving element, a driven element, a casing fixed to one element and embracing the other element, a member mounted within and rotatable with said casing and having a plurality of sets of thrust seats in its face adjacent the rear wall of the said casing, the seats of each of said sets being of varying depth, a bell crank for each set adapted to engage the said seats, a ring connected to said bell cranks, and angularly adjustable means connected to said ring for maintaining the bell cranks in position to engage thrust seats of desired depth.

8. In a friction clutch, the combination of a driving element, a driven element, a casing fixed to one element and embracing the other element, a member mounted within the casing and rotatable therewith and having a plurality of thrust seats of varying depth connected by inclined surfaces, a bell crank pivotally mounted within the casing and adapted to engage said thrust seats, and means for moving said bell crank angularly with respect to the said member from one seat to the next over the inclined wall connecting them.

9. In a friction clutch, the combination of a driving element, a driven element, a casing fixed to one element and embracing the other element, a member mounted within and rotatable with said casing and having a plurality of thrust seats of varying depth, a bell crank pivoted within the casing and having an arm adapted to engage said thrust seats, the end of the arm adjacent the said thrust seats being beveled at its forward edge, and means for moving the said bell crank angularly with respect to the said member to move the said bell crank from one seat to the next, the surface between the seats passing under the beveled edge of the arm of the bell crank.

10. In a friction clutch, the combination of a driving element, a driven element, a casing secured to one element and embracing the other element, a member mounted within and rotatable with said casing and having a plurality of thrust seats connected by inclined surfaces in its face adjacent the rear wall of the casing, a bell crank having an arm adapted to engage said thrust seats, and means for moving the said bell crank angularly with respect to the said member to move the said arm from one thrust seat to the next, the edge of the said arm which passes over the inclined surface connecting said seats being beveled to facilitate the movement of the arm from one seat to the other.

MARSHALL BECK.

Witnesses:
C. W. BORG,
A. W. ALLISON.